US011700240B2

(12) United States Patent
Max et al.

(10) Patent No.: US 11,700,240 B2
(45) Date of Patent: Jul. 11, 2023

(54) PROVIDING DATA OF A MOTOR VEHICLE

(71) Applicants: Volkswagen Aktiengesellschaft; Audi AG, Ingolstadt (DE)

(72) Inventors: Stephan Max, Gifhorn (DE); Markus Stinner, Munich (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 17/464,224

(22) Filed: Sep. 1, 2021

(65) Prior Publication Data

US 2022/0070148 A1    Mar. 3, 2022

(30) Foreign Application Priority Data

Sep. 2, 2020   (DE) .......................... 102020122894.5

(51) Int. Cl.
| | | |
|---|---|---|
| *H04L 9/40* | (2022.01) | |
| *G07C 5/00* | (2006.01) | |
| *G06F 21/62* | (2013.01) | |
| *H04W 12/02* | (2009.01) | |

(52) U.S. Cl.
CPC ...... *H04L 63/0421* (2013.01); *G06F 21/6254* (2013.01); *G07C 5/008* (2013.01); *H04L 63/0428* (2013.01); *H04W 12/02* (2013.01)

(58) Field of Classification Search
CPC ............ H04L 63/0421; H04L 63/0428; G06F 21/624; G07C 5/008; H04W 12/02
USPC ........................................................ 713/168
See application file for complete search history.

(56) References Cited

U.S. PATENT DOCUMENTS

| | | | | |
|---|---|---|---|---|
| 5,493,283 A | * | 2/1996 | Hopper ..................... | G01S 5/16 713/168 |
| 6,175,921 B1 | * | 1/2001 | Rosen ................... | G06Q 20/204 713/168 |
| 7,269,256 B2 | * | 9/2007 | Rosen ..................... | G06Q 20/12 713/168 |
| 7,392,388 B2 | * | 6/2008 | Keech .................... | G06Q 20/04 713/168 |
| 2002/0016838 A1 | * | 2/2002 | Geluc ................... | H04L 63/101 713/168 |
| 2003/0130893 A1 | | 7/2003 | Farmer | |

(Continued)

FOREIGN PATENT DOCUMENTS

WO    2020001743 A1    1/2020

OTHER PUBLICATIONS

DE102020122894.5. Examination Report (dated May 17, 2021).
EP 21193903.8. Extended EP Search Report (dated Jan. 27, 2022).

*Primary Examiner* — Amare F Tabor

(74) *Attorney, Agent, or Firm* — Peter Zura; Loza & Loza, LLP

(57) ABSTRACT

Technologies and techniques for anonymously providing data of a motor vehicle. A first dataset is generated by a motor vehicle, and the first dataset is anonymized using a vehicle computing unit. User related data and the anonymized first dataset are communicated to a first server system using the vehicle computing unit and the communicated user related data is deleted using the first server system. The anonymized first dataset is communicated to a second server system using the first server system after deletion of the user related data.

20 Claims, 2 Drawing Sheets

(56) References Cited

U.S. PATENT DOCUMENTS

| | | | |
|---|---|---|---|
| 2007/0226807 A1* | 9/2007 | Ginter | G06F 21/572 713/168 |
| 2014/0059694 A1 | 2/2014 | Lortz et al. | |
| 2014/0136847 A1* | 5/2014 | Huang | H04L 9/321 713/168 |
| 2015/0089236 A1 | 3/2015 | Han et al. | |
| 2015/0304331 A1 | 10/2015 | Nakagawa et al. | |

* cited by examiner

PROVIDING DATA OF A MOTOR VEHICLE

CROSS REFERENCE TO RELATED APPLICATION

The present application claims priority to German Patent Application No. 10 2020 122 894.5, to Max, et al., filed Sep. 2, 2020, the contents of which is incorporated by reference in its entirety herein.

FIELD OF TECHNOLOGY

The present disclosure relates to technologies and techniques for anonymously providing data of a motor vehicle, wherein a first dataset is generated by means of the motor vehicle and the first dataset is anonymized by means of a vehicle computing unit of the motor vehicle and user related data and the anonymized first dataset are communicated to a first server system by means of the vehicle computing unit. Further, the present disclosure relates to a server system network for using data of a motor vehicle as well as to a communication system.

BACKGROUND

In context of interconnected motor vehicles, vehicle systems are employed to send the data from a motor vehicle to a server backend. Therein, user related and non-user related data is gathered and communicated. However, only non-user related data is required for many applications or user related data is only required to a low extent and in restricted or anonymized form, respectively. Therein, exemplary uses of non-user related data can include the establishment of a weather map with measurement data from a vehicle fleet, the establishment of a traffic flow map from motion data of the vehicle fleet, the central warning of recognized danger spots, such as for example glazed frost or accidents, and the like.

For example, communication data, position data of the motor vehicle, corresponding time stamps or vehicle identification data can be gathered and communicated as the user related data. This data may be insignificant for the described uses not related to a user or only required to a restricted extent. However, the user related data is gathered in terms of a safe communication or is partially required, such as for example in case of position data, to match the gathered dataset with a map.

In known approaches, all of the user related data and non-user related data is communicated to the server backend and anonymized in the server backend as early as possible. However, this has the disadvantage that the data transmission itself is not effected anonymously and user related data has to be transmitted via the corresponding air interface. This is disadvantageous from points of view of the data safety as well as optionally for considerations of data protection law.

In the document DE 10 2014 005 589 A1, a method for anonymized transmission of data related to motor vehicle is proposed. Therein, the data related to motor vehicle has an identifier, which is independently generated. For anonymizing the data, an association of identifier with the individual motor vehicle is not created on a central computer.

However, this method is prone to misuse since both the identifier and the data related to motor vehicle are present on the central computer.

In the document US 2003/0130893 A1, a method for protecting personal data is described, which is generated by or obtained from a vehicle. Therein, at least one data element is acquired from a mobile system, for example the vehicle, which includes personal identification information. The personal identification information is removed from the data element and the data element is wirelessly communicated to a receiver.

However, only a formal anonymization is thereby achieved since information can be taken from the data element also after the removal of the personal identification information, which can allow at least an approximate association of the data with a user and the vehicle, respectively.

SUMMARY

Against this background, an aspect of the present disclosure is to specify an improved concept for providing data of a motor vehicle, by which user related data can be protected with higher reliability.

This aspect is solved by the respective subject matter of the independent claims. Advantageous configurations and preferred embodiments are the subject matter of the dependent and coordinate claims.

The improved concept is based on the idea to delete user related data, which is communicated from the motor vehicle to a first server system besides an anonymized dataset, by means of the first server system and thereafter to communicate the anonymized first dataset to a second server system by means of the first server system.

According to the improved concept, a method for anonymously providing data of a motor vehicle is specified, wherein a first dataset is generated by means of the motor vehicle and the first dataset is anonymized by means of a vehicle computing unit of the motor vehicle, in particular is anonymized based on a predetermined parameter set. User related data and the anonymized first dataset are, in particular wirelessly, communicated to a first server system by means of the vehicle computing unit. The communicated user related data is deleted by means of the first server system and the anonymized first dataset is, in particular wirelessly, communicated to a second server system by means of the first server system after deleting the user related data.

For example, the first dataset generated by means of the motor vehicle can be generated by one or more sensor systems of the motor vehicle and/or by the computing unit. In particular, the dataset can include further user related data or capable of being related to a user as well as data without user relation. User related data can, for example, be data, which allows or can allow conclusions to the identity of the motor vehicle or a user, for example an owner, of the motor vehicle. Thus, user related data can in particular contain data related to the motor vehicle and/or data related to a person. User related data, that is communicated to the first server system in addition to the anonymized first dataset, can for example include an IP address of the vehicle computing unit or of a communication interface of the vehicle computing unit, a network card identification number of the vehicle computing unit, other device identification numbers of components of the vehicle computing unit or of the motor vehicle, a vehicle identification number, VIN, a user identification number, a customer number of the user, and so on. User related data may also include data concerning one or more positions of the motor vehicle, for example a route driven or planned by means of the motor vehicle, and/or time stamps concerning sensor data or position data.

Data without relation to user can for example include measurement data, raw data or preprocessed measurement and raw data of the sensor system, respectively, weather data of the environment of the motor vehicle or operating data of the motor vehicle, for example a motor vehicle speed or activity information concerning components of the motor vehicle, such as for example a heating device, an air conditioner, windshield wipers or a lighting device of the motor vehicle.

Anonymizing the first dataset can for example include the process of completely or partially removing or deleting the further user related data, modifying the further user related data and/or concealing the further user related data, for example position data and points of time or periods of time. If the first dataset, for example, contains positional courses or routes, the vehicle computing unit can remove parts of the route, for example a start area and/or destination area of the route, for anonymizing. Therein, it is in particular predetermined by the predetermined parameter set, which parts of the first dataset are removed, modified or concealed and how the modification or concealment is performed, respectively, and how severe the concealment or the modification is, respectively.

The first and the second server system may be arranged externally to the motor vehicle and independent of the motor vehicle, which each include one or more server computing units or server nodes. In particular, a server system can include multiple optionally spatially distributed server computing units or server nodes independent of each other and being in a communication link with each other.

By separating the first server system, which deletes the user related data, from the second server system, which can optionally provide the anonymized first dataset for use, the data safety is increased since the second server system does not have the user related data at any point of time. Thus, a potentially abusive use of the anonymized first dataset would require an unauthorized access to two different server systems independent of each other. Therein, the first server system can be regarded as an intermediate backend, which forwards the anonymized first dataset to the second server system as a destination backend.

In that the anonymization is effected in the motor vehicle or by the motor vehicle, less data related to person or related to motor vehicle is additionally transmitted via the air interface between vehicle computing unit and first server system such that a risk of misuse is reduced as well.

BRIEF DESCRIPTION OF THE DRAWINGS

In the following, embodiments of the present disclosure are described. In the figures.

DETAILED DESCRIPTION

Figure 1:
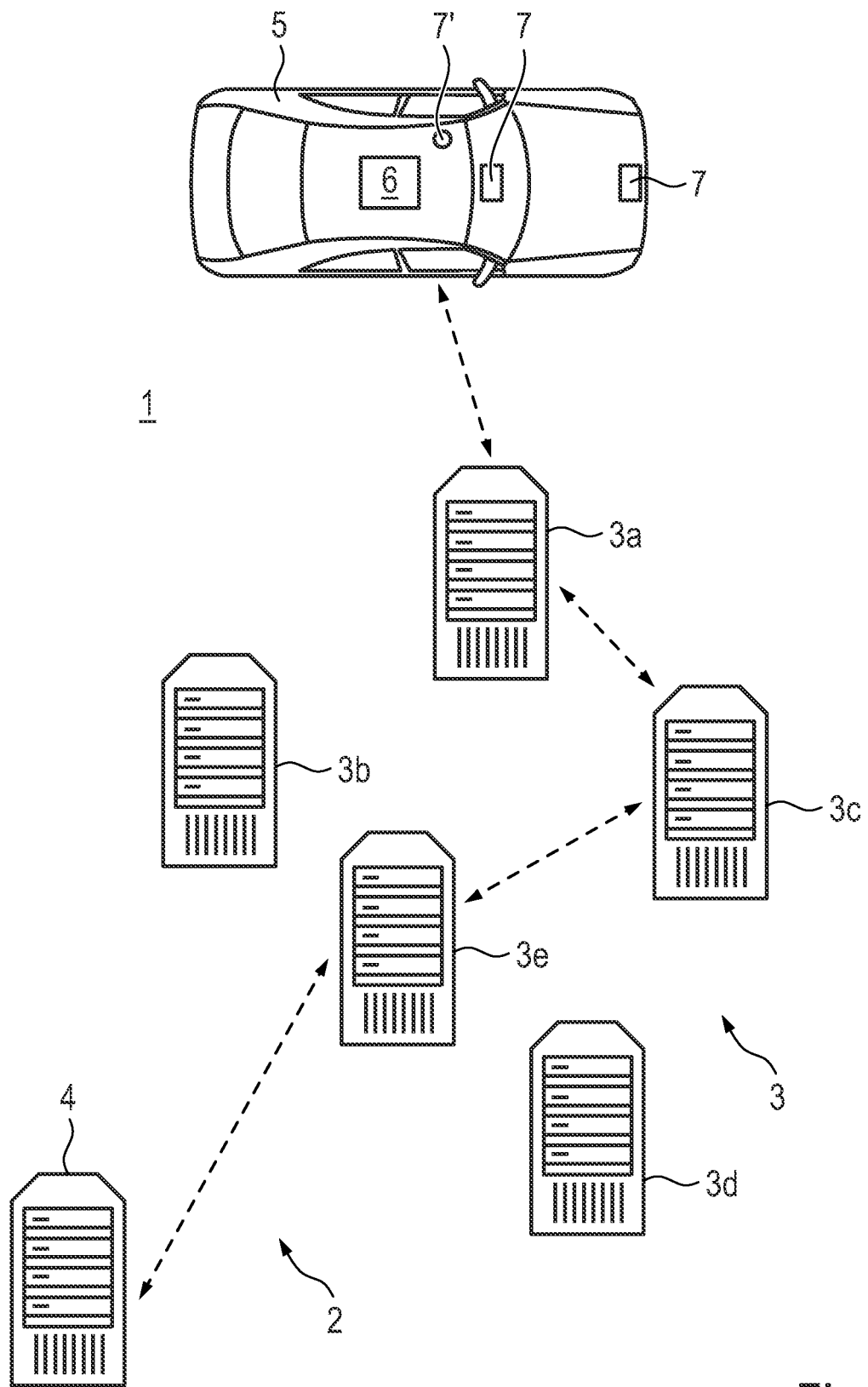
FIG. 1 shows a schematic representation of an exemplary embodiment of a communication system according to the improved concept.

The embodiments explained in the following are preferred embodiments of the present disclosure. In the embodiments, the described components each represent individual features of the present disclosure to be considered independently of each other, which also each develop the present disclosure independently of each other and thereby are also to be regarded as a constituent of the present disclosure in individual manner or in a combination other than the shown one. Furthermore, the described embodiments can also be complemented by further ones of the already described features of the present disclosure.

In the figures, functionally identical elements are provided with the same reference characters, respectively.

In some examples discussed herein, ae server system includes a plurality of server nodes. By means of a vehicle computing unit and/or by means of a first server system, a transmission route may be determined, which includes at least two server nodes of the plurality of server nodes. The anonymized first dataset may be communicated from an entry node of the at least two server nodes to an exit node of the at least two server nodes according to the transmission route and the anonymized first dataset is communicated to the second server system by means of the exit node.

As already mentioned above, an independent server computing unit can be understood as a server node, which is in communication link with one or more further server nodes.

The transmission route may define which server nodes of the plurality of server nodes in which order the transmission of the anonymized first dataset is to be effected, and which server node of the plurality of server nodes is to serve as the entry node and which server node of the plurality of server nodes is to serve as the exit node, respectively. Therein, a server node of the plurality of server nodes may also be contained multiple times in the transmission route.

In some examples, the vehicle computing unit can determine the transmission route, and also determine the entry node. In other examples, the entry node can be predetermined. In such examples, the remainder of the transmission route can be determined by means of the vehicle computing unit and/or by means of the first server system.

Thus, the first server system may be regarded as a cluster of server nodes. By means of this cluster, the user related data is deleted and the remaining data, thus the anonymized first dataset, is sent between different server nodes, optionally multiple times, such that a reidentification of the vehicle computing unit is no longer possible or only possible with extremely high effort. Thereby, the data safety can be severely further increased.

For example, the transmission route can be specifically determined for the specific vehicle computing unit or the specific motor vehicle, independently of corresponding transmission routes, which may be optionally determined for further motor vehicles of a motor vehicle fleet. Thereby, the traceability can be further reduced. In addition, the transmission route can for example be newly determined for further transmissions of data such that a reidentification either does not become possible by permanently monitoring. Therein, the transmission route can for example remain the same for a certain time or a certain number of data transmissions or for a certain data volume and then be automatically newly determined. In other words, the transmission route can be dynamically selected.

According to at least one example, the user related data is deleted by means of the entry node.

Therefore, the user related data is only present on the entry node together with the anonymized first dataset, while only the anonymized first dataset is present on the further one of the at least two server nodes of the transmission route, respectively. Thereby, the data safety is further increased.

In some examples, the transmission route may be randomly determined by means of the vehicle computing unit and/or by means of the first server system.

Thereto, the vehicle computing unit may randomly select all of the server nodes of the at least two server nodes according to the transmission route from the plurality of server nodes. Alternatively, the entry node can randomly select all of the further server nodes of the at least two server nodes from the plurality of server nodes.

In some examples, the transmission route may be randomly determined each time it is newly determined. Thereby, it is achieved that a given transmission route is only used for a limited time, which further aggravates the identification of the vehicle computing unit.

In some examples, the anonymized first dataset is encrypted by means of the vehicle computing unit before communication thereof to the first server system and the encrypted anonymized first dataset is decrypted by means of the second server system, after deleting the user related data by the first server system.

Thereby, it is ensured that the first anonymized dataset is present on the first server system, in particular the entry node, only in encrypted form at the same time with the user related data. Thereby, the data safety is further increased.

In some examples, the anonymized first dataset may be encrypted multiple times by means of the vehicle computing unit before communication thereof to the first server system and the encrypted anonymized first dataset is partially decrypted by means of the first server system. The partially decrypted anonymized first dataset may be completely decrypted by means of the second server system.

Thereby, it is achieved that the completely decrypted anonymized first dataset is not present on any server node of the first server system such that the data safety is further increased.

In particular, the multiple encryption can be performed as an n-fold encryption, wherein n−1 is equal to the number of the at least two server nodes according to the transmission route. In such embodiments, each server node of the at least two server nodes according to the transmission route can perform an instance of the partial decryption, thus decrypt one encryption layer. The partially decrypted anonymized first dataset may then be communicated to the second server system in singly encrypted manner, where it can be completely decrypted.

In some examples, a success of the deletion of the further user related data is examined by means of the second server system before the decryption, in particular before the complete decryption, of the encrypted or partially decrypted anonymized first dataset, and the decryption is performed depending on a result of the examination.

The decryption may be performed by means of the second server system only if or exactly if the deletion of the user related data was successful according to the result of the examination. Thereby, the probability can be reduced that a part of the further user related data is present on the second server system at the same time with the completely decrypted anonymized first dataset for unpredictable reasons.

In some examples, the user related data includes the IP address of the vehicle computing unit and/or an identifier associated with the vehicle computing unit.

Therein, the identifier associated with the vehicle computing unit can include a customer identification number or a vehicle identification number.

In some examples, the anonymization may be performed by means of the vehicle computing unit based on the predetermined parameter set. Based on the anonymized first dataset, a degree of anonymization achieved by the anonymization is determined by means of the second server system. Based on the degree of anonymization and in particular based on the predetermined parameter set, an adapted parameter set is generated and communicated to the vehicle computing unit by means of the second server system.

The degree of anonymization can be regarded as a measure for an effort, for example a computing effort, which is required to associate the anonymized first dataset or parts thereof with the motor vehicle or the user of the motor vehicle, thus to perform a reidentification. Therein, the predetermined parameter set in particular has a direct influence on the achieved degree of anonymization. Therein, the predetermined parameter set is in particular also present on the second server system or is for example predetermined by the second server system.

The effort required for the anonymization to achieve a desired degree of anonymization can be different according to the actual situation. For example, if a very large number of motor vehicles, of which corresponding data is gathered, is in a certain spatial and/or temporal range, a relatively low effort in the anonymization can for example result in the fact that the anonymized first dataset can be associated with the actually generating motor vehicle only with considerable effort. In contrast, if only very few motor vehicles providing data are present in the spatial and/or temporal range, thus, a higher effort, for example a more severe concealment or a more comprehensive removal of data parts capable of being related to user, may be required to achieve the desired degree of anonymization. In particular, a certain group or fleet anonymity can be achieved by the anonymization such that the anonymized first dataset can be associated with a vehicle group of a certain size, but not with a specific motor vehicle of the route or fleet. Therefore, according to the size of the group, the degree of anonymization can vary, wherein the degree of anonymization can in particular also be given by the size of the group. The size of the group can be influenced based on the parameter set.

By the adaptation of the parameter set and the generation of the adapted parameter set, respectively, based on the determined degree of anonymization, thus, the anonymization effort can be adapted to the concretely present situation such that a higher reliability in the anonymization and in achieving the desired degree of anonymization, respectively, is achieved, wherein the effort for anonymization can be kept as low as possible.

In some examples, the first dataset is generated by means of the vehicle computing unit and/or a sensor system of the motor vehicle, wherein the sensor system in particular includes one or more environmental sensor systems.

Here and in the following, an environmental sensor system can be understood as a sensor system, which is capable of generating sensor data or sensor signals, which image, represent or reproduce an environment of the motor vehicle. In particular, cameras, lidar systems, radar systems and ultrasonic sensor systems can be regarded as environmental sensor systems.

The first dataset can also include position data, which is generated by means of a digital map system of the motor vehicle and/or by means of a receiver for a global navigation satellite system, GNSS, of the motor vehicle.

In some examples, the anonymized dataset and/or data depending thereon is provided for use by means of the second server system. Therein, the use can be effected by the second server system itself or by a further identity, which has access to the anonymized first dataset and the data depending thereon, respectively, for example a further computing unit or a person.

According to at least one embodiment, a group size is determined by means of the second server system based on the anonymized first dataset, which corresponds to a number of motor vehicles, to which the anonymized dataset can be related. The degree of anonymization is determined depending on the group size or corresponds to the group size.

In particular by the concealment of location and/or time information of the first dataset for anonymizing, a group anonymity can be generated since the corresponding anonymized first data can then be related to an entire group of motor vehicles, but it cannot be determined, which motor vehicle of the group has actually generated the first dataset. The larger the group, the more safely the anonymized first dataset is protected from misuse since the effort to associate the first dataset with one of the motor vehicles increases with the number of motor vehicles in the group.

Therefore, by the adaptation of the parameter set depending on the group size, the group size achieved by the anonymization can be adapted to achieve the desired degree of anonymization, wherein the desired degree of anonymization for example involves or corresponds to a predetermined limit value for the group size or for the number of motor vehicles.

In some examples, a second dataset may be generated by means of the motor vehicle and the second dataset may be anonymized by means of the vehicle computing unit based on the adapted parameter set. The anonymized second dataset is communicated to the first server system by means of the vehicle computing unit.

The explanations with respect to the first dataset and the parameter set apply to the second dataset and the adapted parameter set analogously. After the parameter set has been adapted, it is to be expected that a degree of anonymization, which is achieved by the anonymization of the second dataset based on the adapted parameter set, is increased. Thereby, the data safety concerning the second dataset and further analogously generated and anonymized datasets, respectively, can be improved.

According to at least one embodiment, the motor vehicle is part of a motor vehicle fleet including one or more further motor vehicles, and the adapted parameter set is communicated to a respective further vehicle computing unit of each further motor vehicle of the motor vehicle fleet by means of the second server system.

Thereby, it can in particular be achieved that all of the motor vehicles of the motor vehicle fleet can anonymize corresponding datasets respectively based on the same adapted parameter set. Thereby, the parameter set and the corresponding degree of anonymization, respectively, can be proactively adapted and the reliability and data safety for the entire motor vehicle fleet can thus be increased.

In some examples, a further dataset is generated by means of each further motor vehicle of the motor vehicle fleet and the respective further dataset is anonymized based on the adapted parameter set by means of the respective further vehicle computing unit. The respective anonymized further dataset is communicated to the first server system by means of the respective further vehicle computing unit.

The correspondingly communicated further anonymized datasets can be further processed or provided for use analogously to the communicated anonymized first dataset.

In some examples, the predetermined parameter set may include a delay period and the anonymized first dataset is communicated to the first server system delayed in time according to the delay period by means of the vehicle computing unit.

In other words, the anonymized first dataset is, optionally in an encrypted manner, available for communication to the first server system at a certain point of time, however, the actual communication is effected delayed in time according to the delay period with respect to this point of time.

Thereby, a capability of association of the anonymized first dataset with the motor vehicle and with the user thereof, respectively, is further aggravated and the group size can be further increased, respectively. Thereby, the reliability of the method and the data safety, respectively, are further increased.

The adaptation of the parameter set and the generation of the adapted parameter set, respectively, in particular involve the adaptation of the delay period. The second dataset is in particular communicated to the first server system delayed in time according to the adapted delay period.

According to the improved concept, a server system network for using data of a motor vehicle is specified. The server system network includes a first server system, which is configured to obtain an anonymized first dataset, which is in particular anonymized based on a predetermined parameter set, as well as user related data from the motor vehicle or a vehicle computing unit of the motor vehicle. The first server system may be configured to delete the communicated user related data. The server system network comprises a second server system and the first server system is configured to communicate the anonymized first dataset to the second server system.

According to some examples of the server system network, the first server system includes a plurality of server nodes. The first server system may be configured to determine a transmission route, which includes at least two server nodes of the plurality of server nodes, or to obtain it from the motor vehicle or the vehicle computing unit. The first server system is configured to communicate the anonymized first dataset according to the transmission route from an entry node of the at least two server nodes to an exit node of the at least two server nodes, and the exit node is configured to communicate the anonymized first dataset to the second server system.

Further examples of the server system according to the improved concept directly follow from the various embodiments of the method according to the improved concept and vice versa.

According to the improved concept, a communication system is also specified, which includes a server system network according to the improved concept as well as a vehicle computing unit for the motor vehicle. The vehicle computing unit is configured to anonymize a first dataset generated by the motor vehicle to generate the anonymized first dataset and to communicate the anonymized first dataset to the first server system.

Further examples of the communication system according to the improved concept directly follow from the various examples of the method according to the improved concept and vice versa. In particular, a communication system according to the improved concept is configured to perform a method according to the improved concept or it performs such a method.

The present disclosure also includes the combinations of the features of the described examples.

Turning to FIG. 1, the drawing illustrates a schematic representation of an exemplary embodiment of a communication system 1 according to the improved concept, which includes a server system network 2 and a vehicle computing unit 6 of a motor vehicle 5. In various examples, the motor vehicle 5 can be regarded as a part of the communication system 1. In particular, the motor vehicle 5 may include one or more sensor systems 7, for example environmental sensor systems, speed sensors, temperature sensors and so on, as well as a GNSS receiver 7', for example a GPS, GLONASS, Galileo and/or Beidou receiver. The server system network 2 includes a first server system 3 and a second server system 4. In various forms of configuration, the first server system 3 includes a plurality of independent server nodes 3a, 3b, 3c, 3d, 3f, which are physically and spatially separated from each other and from the second server system 4.

In the following, the functionality of the communication system 1 is explained in more detail based on exemplary embodiments of a method for providing data of the motor vehicle 5 according to the improved concept, in particular with reference to FIG. 2.

Figure 2:
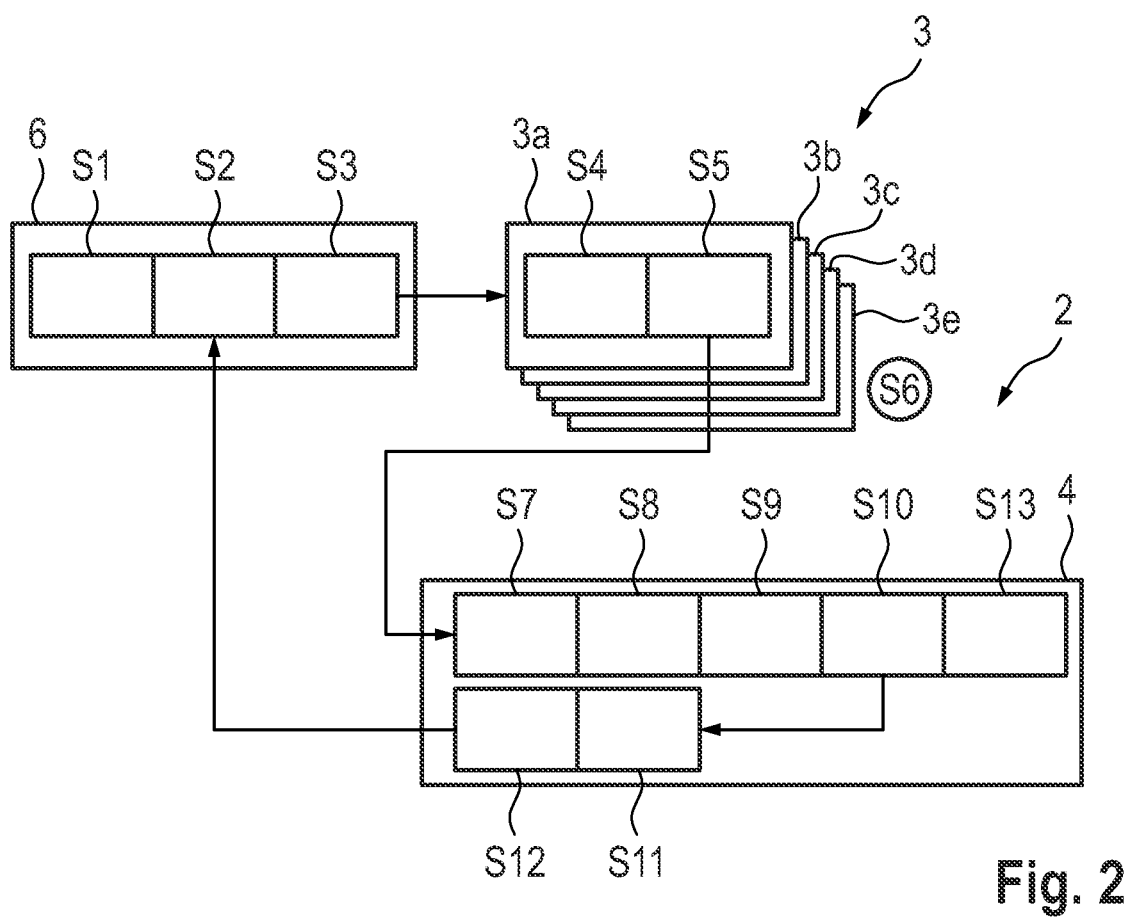
FIG. 2 shows a flow diagram of an exemplary embodiment of a method according to the improved concept.

In FIG. 2, a flow diagram of an exemplary embodiment of a method according to the improved concept is schematically illustrated. The server system network 2 as well as the vehicle computing unit 6 are also schematically illustrated.

In a first method step S1, data is gathered by means of the motor vehicle 5, for example based on the sensor systems 7 and/or the GNSS receiver 7' as well as optionally by further components of the motor vehicle 5 and/or by means of the vehicle computing unit 6, which includes both data not related to a user, such as environmental sensor data, weather data or operating data of the motor vehicle, for example a motor vehicle speed, as well as user related data or capable of being related to user, such as for example communication data, position data of the motor vehicle 5, time stamps concerning the environmental sensor data or the position data, vehicle identification data like a VIN and so on.

In step S2, the gathered data is anonymized by means of the vehicle computing unit 6. Thereby, parts of the gathered data can for example be removed or deleted, such as for example the name of a user, information concerning an official license number of the motor vehicle 5 or other data immediately suitable for identification of the user or of the motor vehicle 5. Within the scope of the anonymization, data parts can also be removed, which can be indirectly used for identification of the user or motor vehicle 5, thus pseudonymous data. For example, start and/or destination positions of routes traveled or planned by means of the motor vehicle 5 can be removed.

In addition, the anonymization can involve concealing position data of the motor vehicle 5, which has, for example, been generated or determined based on map information or on signals received by means of the GNSS receiver 7' and/or concealing corresponding points of time, at which the motor vehicle 5 was located in the corresponding positions. Therein, the concealment can be effected by artificially adding tolerances or errors or by temporally delayed processing or uploading the data to the server system network 2. Time stamps of the position data can also be correspondingly removed.

The specific measures for anonymization finally depend on the fact for which purpose the data of the motor vehicle 5 is to be used. For example, if the data is to serve to establish a traffic flow map or a weather map or the like, thus, position data and optionally also time data or temporal information is required, at least to a certain extent. Therefore, the anonymization is effected based on a predetermined parameter set, which determines, which parts of the data are to be removed or concealed and how severely the concealment is to be performed. The vehicle computing unit 6 can for example obtain the parameter set from the server system network 2.

By the anonymization, a group anonymization may be achieved such that the motor vehicle 5 is no longer uniquely identifiable in a motor vehicle fleet with further motor vehicles.

In the method outlined according to FIG. 2, the first server system includes the plurality of server nodes 3a, 3b, 3c, 3d, 3e, wherein the concrete number of the server nodes 3a, 3b, 3c, 3d, 3e is to be purely exemplarily understood and in particular can also be greater than five, for example can include several 10, several 100 or several 1000 of server nodes.

In step S3, the vehicle computing unit 6 for example may determine a transmission route for transmitting the anonymized first dataset in that the vehicle computing unit 6 may determine an entry node 3a of the plurality of server nodes 3a, 3b, 3c, 3d, 3e, determines an exit node 3e of the plurality of server nodes 3a, 3b, 3c, 3d, 3e as well as optionally one or more intermediate nodes 3c of the plurality of server nodes 3a, 3b, 3c, 3d, 3e. In addition, the vehicle computing unit 6 may determine an order of the intermediate nodes 3c. In various embodiments, the entry node 3a can also be predetermined. In such embodiments, the entry node can partially or completely determine the transmission route, in particular determine the intermediate nodes 3c and/or the exit node 3e. In the exemplary example of FIG. 1, the transmission route is composed of the entry node 3a, one intermediate node 3c and the exit node 3e. In addition, the anonymized first dataset is encrypted by means of the vehicle computing unit 6 in step S3.

In step S4, the encrypted anonymized data may be communicated to the entry node 3a. Besides the anonymized data, therein, further user related data is in particular also communicated, in particular an IP address of the vehicle computing unit 6. In step S5, this user related data is therefore deleted by means of the entry node 3a. Therein, the deletion is in particular effected without the encrypted data being previously decrypted.

In step S6, the anonymized first dataset may be communicated from the entry node 3a to the exit node 3e according to the transmission route after deleting the user related data in that it is communicated from the entry node 3a to the intermediate node 3c and from the intermediate node 3c to the exit node 3e. By the multiple communication within the first server system 3, it can be nearly excluded that a reidentification of the vehicle computing unit 6 is performed.

The anonymized first dataset may be communicated from the exit node 3e to the second server system 4 in step S7. In the optional step S8, the success of the deletion of the user related data can be examined, and only if it is determined that all of the user related data, which has been communicated together with the anonymized data, has been removed, the data is passed and further processed, respectively. In step S9, the encrypted and anonymized data is decrypted by the second server system 4.

In some examples, the encryption in step S3 can be configured as a multiple encryption such that each one encryption layer is provided for each server node 3a, 3c, 3e of the transmission route as well as for the second server system 4. In the outlined example, this means that the anonymized data is for example encrypted four times in step S3. Each server node 3a, 3c, 3e according to the transmission route can decrypt one layer of the encryption layers such that the anonymized data is communicated to the second server system 4 in singly encrypted manner in step S7. In step S9, the anonymized dataset can then be completely decrypted.

In step S10, a quality inspection of the anonymization can be performed. Thereto, a degree of anonymization achieved by the anonymization can in particular be determined and for example be compared to a predetermined limit value for the degree of anonymization by means of the second server system 4. Depending on a result of the comparison, the parameter set for anonymizing the data can be adapted in step S11. Thereby, the efficiency or efficacy of the anonymization can be improved or gradually improved.

In step S12, the adapted parameter set is communicated to the vehicle computing unit 6 and to corresponding vehicle computing units of the further motor vehicles of the motor vehicle fleet, respectively. For further anonymizations, the vehicle computing unit 6 can then use the adapted parameter set. In step S13, the anonymized data is supplied to its intended use and provided for the use for third parties, respectively, by means of the second server system 4.

As explained, in particular with respect to the figures, the improved concept allows improving the data safety of data related to person or related to motor vehicle upon the use of data of a motor vehicle and increasing the reliability of the data protection.

REFERENCES

1 Communication system
2 server system network
3, 4 server systems
3a, 3b, 3c, 3d, 3e server nodes
5 motor vehicle
6 vehicle computing unit
7 sensor systems
7' GNSS receiver
S1 to S13 method steps

The invention claimed is:

1. A method for anonymously providing data of a motor vehicle, comprising:
   anonymizing a first dataset of a motor vehicle via a vehicle computing unit;
   determining a transmission route comprising at least an entry node and an exit node of a plurality of server nodes of a first server system,
   communicating, via the vehicle computing unit, user related data and the anonymized first dataset to the first server system via the entry node of the transmission route;
   deleting the communicated user related data via the entry node of the first server system; and
   communicating the anonymized first dataset to a second server system via the exit node of the transmission route.

2. The method of claim 1, wherein the transmission route is randomly determined via the vehicle computing and/or the first server system.

3. The method of claim 1, further comprising encrypting the anonymized first dataset via the vehicle computing unit before communicating to the first server system, wherein the encrypted anonymized first dataset is decrypted via the second server system.

4. The method of claim 3, further comprising determining a success of deletion of the user related data by the second server system, and wherein the decryption via the second server system is performed depending on a result of the determination.

5. The method of claim 1, further comprising performing multiple encryptions on the anonymized first dataset via the vehicle computing unit before communicating to the first server system, wherein a first portion of the multiple encrypted anonymized first dataset is decrypted via the first server system, and a second portion of the multiple encrypted anonymized first dataset is decrypted via the second server system.

6. The method of claim 1, wherein the user related data comprises an IP address of the vehicle computing unit and/or an identifier associated with the vehicle computing unit.

7. The method of claim 1,
   wherein anonymizing the first dataset is based on a predetermined parameter set,
   and wherein a degree of anonymization is determined based on the anonymized first dataset via the second server system,
   and further comprising generating an adapted parameter set based on the degree of anonymization.

8. The method of claim 7, wherein the predetermined parameter set comprises a delay period and the anonymized first dataset is communicated to the first server system according to the delay period.

9. The method of claim 1, further comprising determining a number of motor vehicles, to which the anonymized dataset can be related, based on the anonymized first dataset and determining a degree of anonymization depending on the number via the second server system.

10. The method of claim 1, further comprising generating a second dataset and anonymizing the second dataset based on an adapted parameter set via the vehicle computing unit, wherein the anonymized second dataset is communicated to the first server system via the vehicle computing unit.

11. A server system network for anonymously providing data of a motor vehicle, comprising:
    a vehicle computing unit for anonymizing a first dataset of a motor vehicle; and
    a first server system comprising a plurality of server nodes, wherein a transmission route comprising at least an entry node and an exit node of the plurality of server nodes of a first server system is determined by one of the first server system or vehicle computing unit,
    wherein the vehicle computing unit is configured to communicate user related data and the anonymized first dataset to the first server system via the entry node of the transmission route,
    wherein the first server system is configured to delete the communicated user related data via the entry node, and communicate the anonymized first dataset to a second server system via the exit node of the transmission route.

12. The server system network of claim 11, wherein the transmission route is randomly determined via the vehicle computing and/or the first server system.

13. The server system network of claim 11, wherein the vehicle computing unit is configured to encrypt the anonymized first dataset before communicating to the first server system, and wherein the encrypted anonymized first dataset is decrypted via the second server system.

14. The server system network of claim 13, wherein the second server is configured to determine a success of deletion of the user related data, and wherein the decryption via the second server system is performed depending on a result of the determination.

15. The server system network of claim 11, wherein the vehicle computing unit is configured to perform multiple encryptions on the anonymized first dataset before communicating to the first server system, wherein a first portion of the multiple encrypted anonymized first dataset is decrypted via the first server system, and a second portion of the multiple encrypted anonymized first dataset is decrypted via the second server system.

16. The server system network of claim 11, wherein the user related data comprises an IP address of the vehicle computing unit and/or an identifier associated with the vehicle computing unit.

17. The server system network of claim 11,
wherein anonymizing the first dataset is based on a predetermined parameter set,
and wherein a degree of anonymization is determined based on the anonymized first dataset via the second server system,
and wherein an adapted parameter set is generated based on the degree of anonymization.

18. The server system network of claim 17, wherein the predetermined parameter set comprises a delay period and the anonymized first dataset is communicated to the first server system according to the delay period.

19. The server system network of claim 11, wherein the second server system is configured to determine a number of motor vehicles, to which the anonymized dataset can be related, based on the anonymized first dataset and determining a degree of anonymization depending on the number.

20. The server system network of claim 11, wherein the vehicle computing unit is configured to generate a second dataset and anonymize the second dataset based on an adapted parameter set via the vehicle computing unit, wherein the anonymized second dataset is communicated to the first server system via the vehicle computing unit.

\* \* \* \* \*